Figures 1, 2:
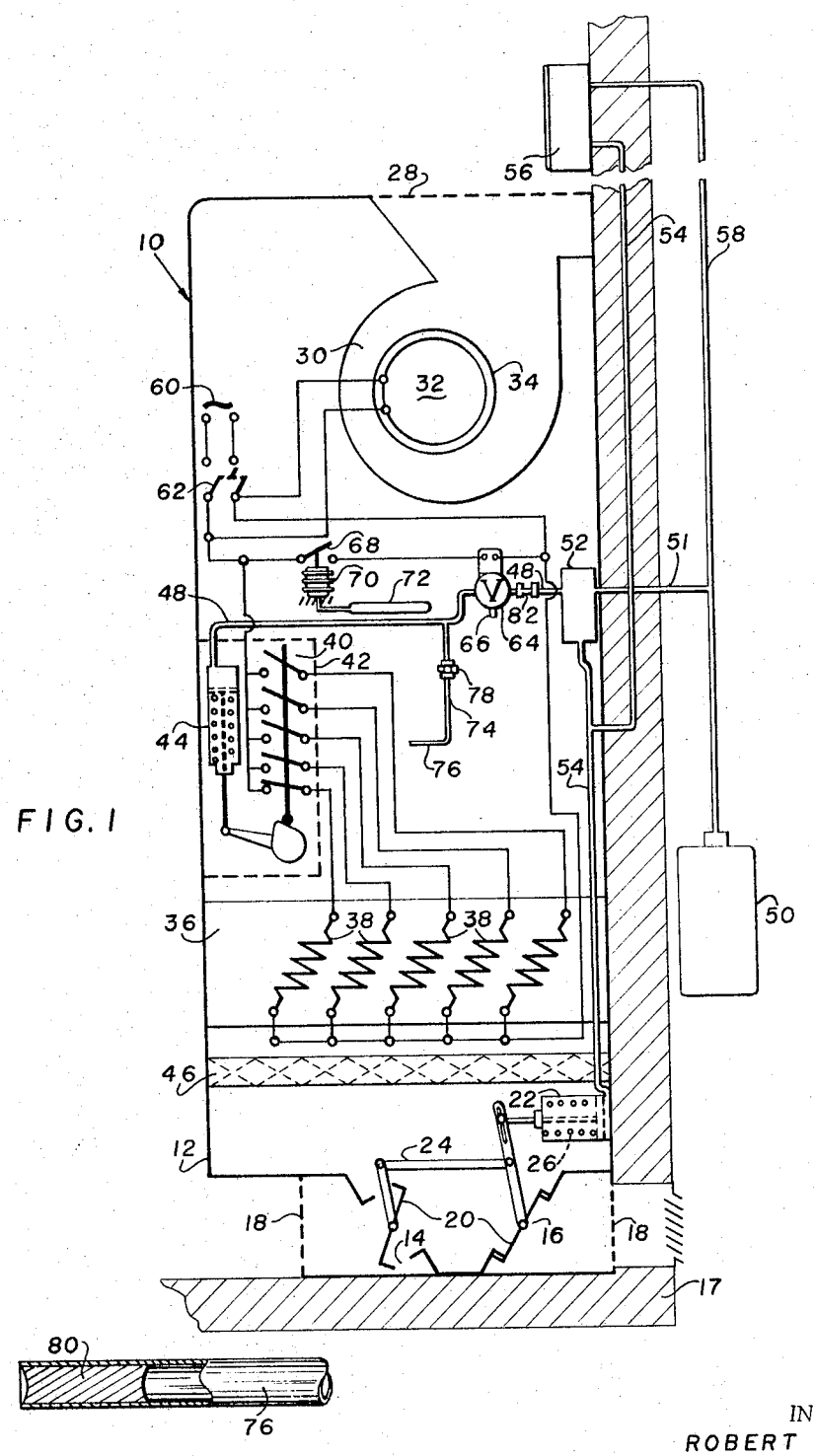

INVENTOR.
ROBERT G. MINER
BY
Holmes & Andersen
ATTORNEYS

United States Patent Office 3,297,857
Patented Jan. 10, 1967

3,297,857
HEATING CONTROL SYSTEM
Robert G. Miner, La Crosse, Wis., assignor to The Trane Company, La Crosse, Wis., a corporation of Wisconsin
Filed Nov. 15, 1963, Ser. No. 323,996
9 Claims. (Cl. 219—369)

This invention relates to heating systems and more particularly to electric heating systems provided with pneumatic controls.

A principal object of this invention is to provide an electrical heating system having pneumatic controls with a positive shut-off responsive to excessive temperature conditions.

Another object of the invention is to provide a thermal responsive fuse for a pneumatic control.

A further object of my invention is to provide an electrical heater system having pneumatic controls and a pneumatic fuse for positively shutting off the pneumatic control pressure upon being subjected to an extreme temperature.

Still another object of my invention is to provide a fuse for an electrical heater applied in a novel manner which is more accurate and more economical than the conventional electric fuse.

Other objects and advantages will become apparent as this specification proceeds to describe the invention with reference to the accompanying drawing in which:

FIGURE 1 shows a schematic view of an electric heating and ventilating unit having a control system employing my invention; and FIGURE 2 is an enlarged view of the pneumatic fuse employed in my invention with a portion in section showing the fusible plug therein.

With reference to the drawing it will be seen that space heating unit 10 is provided with an upright sheet metal casing 12 having at its lower portion a first air inlet 14 adapted to be arranged in fluid communication with the space to be heated to receive return air therefrom and a second air inlet 16 adapted to be arranged in fluid communication with a source of fresh or outside air such as for example by an aperture in the wall 17 of the conditioned space. Each of said air inlets may be provided with a grill 18. Each air inlet further is provided with a damper 20 for controlling the flow of air through its respective air inlet. A pneumatic actuator 22 may be arranged to control the position of dampers 20 through a control linkage 24 which may function to control the proportion of air flowing through the several air inlets. Actuator 22 may be of the piston and cylinder type having a spring 26 for biasing the damper at aperture 16 toward the fully closed position and the damper at inlet 14 toward the fully open position when the pneumatic actuator 22 does not receive a pneumatic pressure. The damper mechanism may be arranged to open the fresh air damper at least a predetermined minimum any time the actuator senses substantially any pneumatic pressure as is common practice. For purposes of simplicity such an arrangement has not been shown.

Casing 12 has an air discharge outlet 28 at the upper portion thereof. A centrifugal fan 30 is mounted within casing 12 with its discharge connected to outlet 28. When fan motor 32 is energized, air is drawn through at least one of the air inlets, through the casing interior, into the fan inlet 34, and discharged through outlet 28 to the space conditioned by the heating unit.

Disposed within casing 12 upstream of fan 30 and downstream of the air inlets is an electric air heater 36 having a plurality of resistance heating elements 38 which are electrically connected to a stepping switch 40 of controller 42 for progressively energizing said heating elements in a step-wise manner. Controller 42 also contains a pneumatic actuator 44 which is operatively connected to switch 40 for progressively energizing additional heating elements upon receiving an increasing pneumatic control pressure. An example of such a controller is the G-180 series Pneumatic Step Controller available from Johnson Service Company. For purifying the air prior to passing over heater 36, a filter 46 is arranged downstream of inlets 14 and 16.

The heating system described is provided with a control system comprised of a first fluid conduit 48 connected at one end to pneumatic actuator 44 and at the other end to a source of constant pneumatic pressure 50 as by conduit 51. The pneumatic pressure delivered to actuator 44 is controlled by a pneumatic reversing relay 52 connecting conduits 48 and 51 which is responsive to the pressure in conduit 54. Relay 52 may be a C-108 Reverse Acting Proportional Cumulator available from Johnson Service Company. The function of relay 52 will be more completely explained in connection with the operation of the heating system. The pneumatic pressure in conduit 54 is controlled by a direct acting pneumatic thermostat 56 disposed in the conditioned space and connected to the pneumatic pressure source 50 via conduit 58. Thermostat 56 may be a T4002 Proportional Direct Acting Room Thermostat also available from Johnson Service Company. Conduit 54 is also connected to pneumatic actuator 22 for controlling damper means 20.

The operation of the control system thus far described will now be explained. As the temperature in the space conditioned by the heating unit 10 rises for example 5° F. above a predetermined set point such as 70° F., pneumatic thermostat 56 connected to pneumatic source 50 via conduit 58 will supply more fluid from pressure source 50 to conduit 54 and raise the pressure in conduit 54 which will cause pneumatic actuator 22 to move the damper at the fresh air inlet 16 toward the open position and the damper at the return air inlet 14 toward the closed position. The rise in pressure in conduit 54 will also act upon the pneumatic reversing relay 52 to exhaust to the atmosphere some fluid in conduit 48 which in turn causes pneumatic actuator 44 to move switch 40 to a position delivering less electrical power to heater 36. Reversing relay 52 can be eliminated if an inversely acting pneumatic thermostat is employed, i.e., one in which the pressure output change is inverse to the temperature change. In such an arrangement the heater switch must be designed to deliver increasing power upon receiving a decreasing pneumatic pressure and yet upon receiving less than a predetermined minimum pressure the power must be completely interrupted. The arrangement using the reversing relay is thus preferred as it permits both pneumatic actuators 44 and 22 to move the switch 40 and dampers 20 respectively directly to the desired position upon a failure of the pneumatic pressure source.

In the operation above described, switch 40 and dampers 20 will establish an equilibrium position dictated by thermostat 56. Should the temperature in the conditioned space fall below the predetermined set point, thermostat 56 will exhaust to the atmosphere some fluid in conduit 54 thereby reducing the pressure therein. A reduction in pressure in conduit 54 causes actuator 22 to reduce the proportion of fresh air and increase the proportion of return air delivered to the unit 10. The reduction in pressure in conduit 54 also actuates pneumatic reversing relay 52 to increase the pressure in conduit 48 which in turn causes pneumatic actuator 44 to move switch 40 to a position delivering more electrical power to heater 36. For these purposes the resistance heating elements 38 of the heater 36 arranged in series with stepping switch 40 are connected to an electrical power source 60 as by manual power switch 62. Fan motor 32 may also be connected to the same power source through switch 62.

While the air flow through the heating unit will normally be sufficient to limit the temperature from rising to abnormal levels, a three-way solenoid valve 64 is disposed in conduit 48 to function as a high temperature cut-off. Valve 64 may have a first position permitting unrestricted passage of fluid through conduit 48 and a second position interrupting fluid communication between relay 52 and actuator 44 venting that segment of conduit 48 between actuator 44 and valve 64 to the atmosphere through vent 66. Valve 64 is normally held in the first of said positions when energized by connection to electric power source 60 via thermal responsive high limit switch 68 having a bellows actuator 70 connected to a fluid filled temperature sensing bulb 72 arranged within the casing 12. When the temperature at bulb 72 reaches a predetermined high limit, which may be caused by a restriction of the air flow such as by an obstacle blocking the air inlet or outlet, valve 64 will be actuated to its second position to drop the control pressure on pneumatic actuator 44 thus opening stepper switch 40 and de-energizing heater 36. As an alternative, obviously three-way valve 64 may take the form of two separate two-way valves, if desired.

In the event that bellows 70, switch 68 or valve 64 fails to function as described, the heater may not be de-energized when the high limit temperature is reached. To protect against this possibility, I have provided a pneumatic fuse 74 connected in fluid communication with that portion of conduit 48 between valve 64 and actuator 44 which will release the pressure in conduit 48 when the temperature rises appreciably above the setting of the high limit switch 68.

The term "pneumatic fuse" as used without further modification in this specification and appending claims is intended to means a structure presenting an atmospheric vent in a pneumatic control conduit and having a closing means therefor which is opened in response to at least a portion thereof being subjected to a predetermined high temperature thereby opening said vent to the atmosphere wherein that portion subjected to the predetermined high temperature is at least partially melted, destroyed or otherwise dislodged so as to prevent the reclosing of the vent in response to a reduction of the temperature below the predetermined high temperature.

Fuse 74 may be comprised of an elongated metallic tube 76 connected to conduit 48 as by coupling 78. The free end of tube 76 is provided with a metallic plug 80 which is bonded therein and has a melting point below that of tube 76 between about 200° F. and 350° F.

I have found that it may further be desirable to place a fluid flow restrictor 82 in conduit 48 between valve 64 and the pressure source or reversing relay 52. This precludes the possibility of fuse 80 not being able to adequately release the pressure at actuator 44 when the pressure of the source 50 is high.

Although I have described in detail the preferred embodiment of my invention, I contemplate that many changes may be made without departing from the scope or spirit of my invention and I desire to be limited only by the claims.

I claim:

1. A heating system comprising an electric heater means; a variable pneumatic pressure supply means for supplying a variable pneumatic pressure; a pneumatic control means connected to receive pneumatic pressure from said variable pneumatic pressure supply means for energizing said electric heater means in response to an increase in pressure from said pneumatic pressure supply means and for de-energizing said electric heater means in response to a decrease in pressure from said pneumatic pressure supply means; and a pneumatic fuse connected in fluid communication with said pneumatic control means and disposed in heat exchange relation with said electric heater means for relieving the pressure from said pneumatic control means upon a predetermined excessive temperature condition.

2. The apparatus as defined in claim 1 wherein said pneumatic fuse is comprised of an elongated tube connected to said pneumatic control means and having a metallic plug bonded therein having a melting point substantially below that of said elongated tube.

3. The apparatus as defined in claim 2 wherein the melting point of said plug lies between 200° F. and 350° F.

4. A heating system for conditioning a space comprising an electric heater; switch means for controlling the amount of electrical power delivered to said electric heater; a pneumatic actuator means for actuating said switch means in response to variations in pneumatic pressure; a pneumatic pressure source; conduit means for conveying pneumatic pressure from said pneumatic pressure source to said pneumatic actuator means; means for varying the pneumatic pressure delivered to said actuator means in response to variations in temperature of the space conditioned by said heating system; and a pneumatic fuse operatively connected in fluid communication with said conduit means and disposed in heat exchange relation with said electric heater.

5. The apparatus as defined by claim 4 wherein said means for varying the pneumatic pressure includes a pneumatic reversing relay connected in said conduit means and a direct acting pneumatic thermostat means for controlling said pneumatic reversing.

6. A heating system for conditioning a space comprising an electric heater; switch means for controlling the amount of electrical power delivered to said electric heater, a pneumatic actuator means for actuating said switch means in response to variations in pneumatic pressure; a pneumatic pressure source; conduit means for conveying pneumatic pressure from said pneumatic pressure source to said pneumatic actuator means; means for varying the pneumatic pressure delivered to said actuator means in response to variations in temperature of the space conditioned by said heating system; a fluid flow restrictor means disposed in said conduit means; a pneumatic fuse disposed in heat exchange relation with said electric heater; and means providing fluid communication between said pneumatic fuse and said conduit means between said pneumatic actuator means and said restrictor means.

7. A space heating unit comprising a casing; a first air inlet in said casing adapted to be disposed in fluid communication with the space to be heated; a second air inlet in said casing adapted to be disposed in fluid communication with a source of fresh air; damper means operatively associated with said first and second inlets; a fluid outlet in said casing; fan means in said casing for moving air entering at least one of said air inlets and discharging the same through said outlet; an electrical air heater means disposed upstream of said fan means and downstream of said air inlets; air filter means disposed upstream of said heater means and downstream of at least one of said air inlets; control means for controlling said heater and said damper means including; switch means for controlling the amount of electrical power delivered to said heater means, a first pneumatic actuator means for actuating said switch means in response to variations in pneumatic pressure, a pneumatic pressure source, first conduit means for conveying pneumatic pressure from said pneumatic pressure source to said first pneumatic actuator means, a second pneumatic actuator means for varying the position of said damper means in response to variations in pneumatic pressure, second conduit means for conveying pneumatic pressure from said source to said second pneumatic actuator means, means for varying the pneumatic pressure delivered to said first and second actuator means in response to variations in temperature of the space conditioned by said heating unit, and a pneumatic fuse operatively connected in fluid communication with said first conduit means and disposed in heat exchange relation with said heater means.

8. The apparatus as defined by claim 7 further including in combination a vent, valve means for selectively providing fluid communication between said first pneumatic actuator and said vent or between said first pneumatic actuator and said pneumatic pressure source, and a thermal responsive actuator for actuating said valve means to one of its selected positions.

9. The apparatus as defined by claim 8 wherein said control means includes a fluid flow restrictor means disposed in said first conduit means between said valve means and said pneumatic pressure source.

References Cited by the Examiner

UNITED STATES PATENTS

| | | | |
|---|---|---|---|
| 1,650,150 | 11/1927 | Nelson | 169—42 X |
| 2,286,749 | 6/1942 | McElgin | 236—38 |
| 2,396,183 | 3/1946 | Lightfoot | 219—513 X |
| 2,594,477 | 4/1952 | Miner et al. | 236—38 X |
| 2,778,917 | 1/1957 | Sullivan | 219—513 X |
| 3,014,206 | 12/1961 | Slavin | 340—229 |

FOREIGN PATENTS 715,109  9/1954  Great Britain.

RICHARD M. WOOD, *Primary Examiner.*

C. L. ALBRITTON, *Assistant Examiner.*